United States Patent [19]

Macht

[11] Patent Number: 4,514,007
[45] Date of Patent: Apr. 30, 1985

[54] VEHICLE FRAME

[75] Inventor: Jon A. Macht, Owatonna, Minn.

[73] Assignee: Owatonna Manufacturing Company, Inc., Owatonna, Minn.

[21] Appl. No.: 447,667

[22] Filed: Dec. 7, 1982

[51] Int. Cl.³ .............................................. B62D 11/04
[52] U.S. Cl. .................................. 296/183; 296/197; 296/203; 180/6.48
[58] Field of Search ................ 296/183, 187, 197, 203, 296/204, 190, 193, 198; 180/6.2, 6.48, 89.1

[56] References Cited

U.S. PATENT DOCUMENTS

| | | | |
|---|---|---|---|
| 3,635,365 | 1/1972 | Bauer | 180/6.48 X |
| 3,850,473 | 11/1974 | Huber | 296/203 |
| 3,924,702 | 12/1975 | Heggen | 296/204 X |
| 4,043,416 | 8/1977 | Albright et al. | 180/6.48 |
| 4,055,262 | 10/1977 | Bauer et al. | 296/190 X |
| 4,124,084 | 11/1978 | Albright et al. | 180/6.48 |
| 4,168,757 | 9/1979 | Mather et al. | 180/6.48 |
| 4,209,071 | 6/1980 | Schuck | 180/6.48 |
| 4,342,470 | 8/1982 | Matsuda | 296/204 X |
| 4,405,280 | 9/1983 | Cochran et al. | 296/197 |

Primary Examiner—Robert B. Reeves
Assistant Examiner—Russell D. Stormer
Attorney, Agent, or Firm—Merchant, Gould, Smith, Edell, Welter & Schmidt

[57] ABSTRACT

A unitary frame (12) which is particularly adapted for skid steer loaders includes an elongate transmission case (66, 68 and 70) secured to the underside of a flat forward floor plate (56) extending between a pair of longitudinal side plates (52). The upper ends of the side plates (52) are formed into fenders (54). A front cross member (64) is secured between the front ends of the side plates (52). A pair of uprights (28) are secured to the rear ends of the side plates (52) and a rearward floor plate (58) extending beyond the side plates. Braces (78, 80) are provided for the axle housings (74, 76) extending outwardly from opposite sides of the transmission case (66, 68 and 70). A hydraulic fluid reservoir (102) is preferably secured beneath the rearward floor plate (58).

18 Claims, 6 Drawing Figures

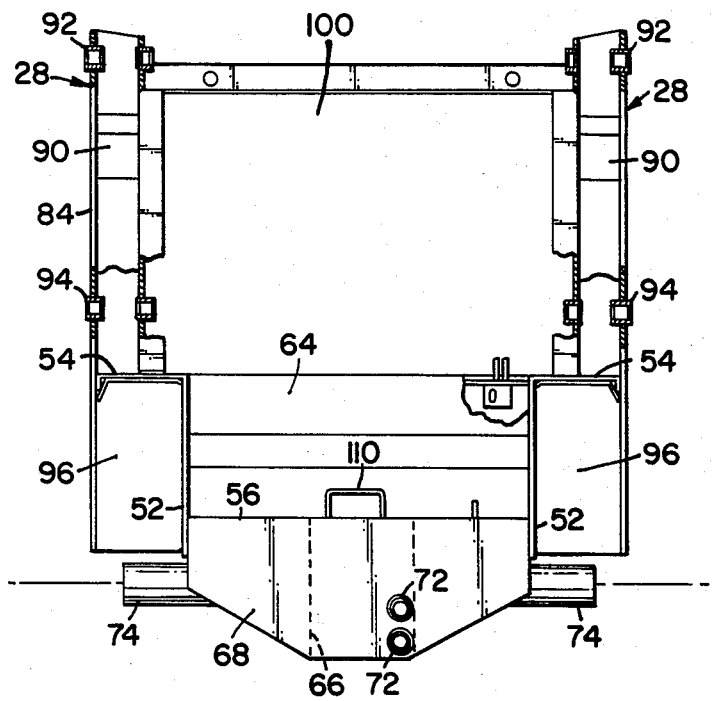

VEHICLE FRAME

TECHNICAL FIELD

The present invention relates generally to a vehicle frame. More particularly, this invention concerns a unitary frame which is adapted for use in skid steer loaders and which utilizes relatively fewer structural members arranged and interconnected to facilitate fabrication and interchangeability, and thus reduce production costs.

BACKGROUND ART

A skid steer loader is a compact, highly maneuverable vehicle in which the wheels on opposite sides of the vehicle are independently driven. Maneuvering is accomplished by driving the wheels on opposite sides of the vehicle at different speeds and/or in different directions to effect propulsion and steering. The operator sits in front of the engine and between a pair of hydraulically actuated loader arms on which a bucket, grapple fork, auger or other implement can be carried. Suitable controls are provided in the operator's compartment for controlling the vehicle itself and the loader arms, as well as any implement mounted on the loader.

Various factors affect the design of skid steer loaders, and particularly their frames. It will be appreciated that the frames of skid steer loaders must necessarily be of rugged construction capable of withstanding skid steering forces and loader forces. Skid steer loaders are typically operated over adverse terrain under less-than-ideal conditions, and this type of operation imposes additional loading requirements on their frames. In addition, there are considerations concerning the relationship between wheel base and track for effective skid steering, the overall height and width of the vehicle, the provision of sufficient space in the operator's compartment for the operator and controls, the location of the center of gravity, etc. which must be taken into account. The frames of skid steer loaders are thus subject to relatively severe design requirements.

One approach to the construction of frames for skid steer loaders has been to utilize a pair laterally spaced apart transmission cases, one for each side of the vehicle, interconnected by various cross members to define an operator's compartment and an engine compartment between the transmission cases. Although somewhat expensive, this approach works reasonably well; however, there are several drawbacks to the use of separate transmission cases. The primary drawback is that the overall width of the vehicle is limited by the fact that sufficient space between the wheels must be provided for the transmission cases and the operator. The overall width of a skid steer loader can be a critical factor in its operational utility, particularly at construction sites where it is necessary to maneuver through doorways or between columns. Raising the operator and positioning the transmission cases only far enough apart to provide space for the feet of the operator is not entirely satisfactory because it raises the center of gravity and the overall height of the vehicle. Positioning the transmission cases closer to the wheels results in the accumulation of more mud and the like, which in turn affects tire wear. Another drawback, which is related to clearance between the transmission cases and wheels, is that accessibility to and maintenance of the hydrostatic transmissions are more difficult. The motors are typically mounted on the inner walls of the transmission cases beneath the vehicle.

Another approach has been to provide a single transmission case for housing the transmissions for both sides of the vehicle. This approach overcomes some of the disadvantages associated with the use of separate transmission cases, however, the prior frames utilizing this approach have had other disadvantages. For example, U.S. Pat. No. 3,895,728 to Heggen shows a skid steer loader having a dual frame arrangement which substantially isolates material handling forces from the tractor body and facilitates location of the drive components in a single body compartment. The drive components are all housed with the center compartment of an inner subframe, which is substantially surrounded by an outer subframe including uprights to which the loader arms are attached. Similarly, U.S. Pat. No. 4,060,262 shows a skid steer loader wherein the transmission case is located between opposite side walls of the outer main frame so that the operator can straddle the transmission case and thereby lower the vehicle profile. Each of these devices thus utilizes two subframes, one of which also functions as the transmission case. This may have some advantages in terms of facilitating separate preassembly of the frames, however, this approach results in increased production costs because of the various brackets, locating structure, and connectors which are necessary to interconnect the subframes. The subframes are connected together by bolts, which are points of stress concentration. Additional braces, stiffeners and the like are thus required to achieve the desired rigidity. Moreover, such two-piece frames do not lend themselves well to achieving commonality or interchangeability of components between different sizes of loaders, which in turn further increases production costs.

A need has thus arisen for a new and improved frame for a skid steer loader wherein the frame consists of relatively fewer structural members formed and connected into a unitary, monocoque-type frame of greater rigidity which results in decreased production costs and increased interchangeability between models.

SUMMARY OF INVENTION

The present invention comprises a unitary frame which overcomes the foregoing and other difficulties associated with the prior art. In accordance with the invention, there is provided a frame of monocoque-type construction which is particularly adapted for use in skid steer loaders to enhance rigidity, facilitate assembly, and reduce production costs. The frame herein includes an elongate, hollow transmission case having a plurality of axle housings extending from opposite sides thereof in lateral, longitudinally spaced pairs. A substantially flat floor plate is secured to the top of the transmission case, and a pair of longitudinal side plates are connected to opposite sides of the floor plate. The upper ends of the side plates are formed into fenders. The front ends of the side plates are interconnected by a front cross member and a front end plate, which closes the front end of the transmission case and which can be an integral portion of the floor plate. The rear end of the transmission case is closed by a rear end plate, which can also be an integral portion of the floor plate. A brace is connected between each axle shaft, associated side plate, and the transmission case. A pair of uprights for mounting the loader arms are provided behind the fender portions of the side plates, and a rear cross member is connected between the uprights to separate the engine compartment from the operator's compartment.

BRIEF DESCRIPTION OF DRAWINGS

A better understanding of the invention can be had by reference to the following Detailed Description in conjunction with the accompanying Drawings, wherein:

FIG. 5 is a front end view of the frame of FIG. 2; and

FIG. 6 is a rear end view of the frame of FIG. 2.

DETAILED DESCRIPTION

Figure 1:
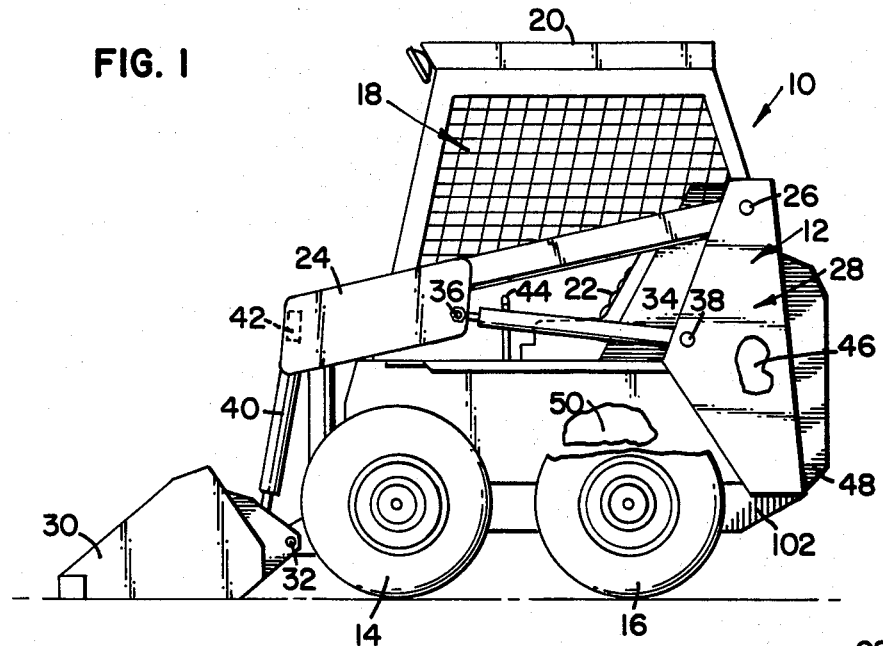
FIG. 1 is a side view of a skid steer loader incorporating the unitary frame of the invention, in which certain parts have been broken away for clarity.

Referring now to the Drawings, wherein like reference numerals designate like or corresponding elements throughout the views, and with particular reference to FIG. 1, there is shown a skid steer loader 10 incorporating the frame 12 of the invention. Although the frame 12 herein is particularly adapted for use in skid steer loaders, it will be appreciated that the frame can also be utilized with other types of vehicles, including adverse terrain vehicles. As will be explained more fully hereinafter, the frame 12 is of monocoque-type construction, and utilizes a relatively fewer number of structural members formed, arranged, and interconnected in a manner which enhances rigidity, facilitates construction and assembly, and reduces production costs.

The skid steer loader 10 includes a pair of front wheels 14 and a pair of rear wheels 16, only one each of which is shown, mounted on a relatively short wheel base to facilitate skid steering. An operator's compartment 18 including a roll cage 20 and a seat 22 is located between a pair of lift arms 24. The inner ends of the lift arms are connected at pivot points 26 to uprights 28 at the rear of the frame 12 and generally behind the operator's compartment 18. An implement such as a bucket 30 is connected at pivot points 32, only one of which is shown, to the outer ends of the lift arms 24. Raising and lowering of the lift arms 24 is effected by a pair of double acting cylinders 34, one of which is coupled between a pivot point 36 on each lift arm and a pivot point 38 on the corresponding upright 28. Tilting of the bucket 30 is effected by a single double acting cylinder 40 coupled between the bucket and a cross member 42 extending between the lift arms 24.

Suitable controls including foot pedals (not shown) and a T bar handle 44 are provided inside the operator's compartment 18 for controlling the skid steer loader 10. An engine 46 is located behind the operator's compartment 18 in an engine compartment between the uprights 28. A door 48 is provided for access to the engine 46 and associated components. The rear mounted engine 46 drives a tandem pump assembly 50 which is located generally beneath the operator's seat 22. The tandem pump assembly 50 includes two variable displacement hydraulic pumps connected to the hydraulic drive motors of the respective hydrostatic transmissions, (not shown) for independently driving each set of wheels 14 and 16. The T bar handle 44 is connected to the pump assembly 50 and maneuvering of the skid steer loader is accomplished in the well known manner by manipulating the handle to effect differential or simultaneous drive of the wheels 14 and 16 as desired.

The constructional details of the frame 12 are shown in FIGS. 2 through 6. Frame 12 can be constructed entirely from sections of hot rolled steel formed and welded together. Frame 12 is comprised of a relatively fewer number of structural components, some of which perform combined functions as will be explained.

The frame 12 includes a pair of longitudinal side plates 52, the upper portions of which are bent outwardly to form fenders 54 for the wheels 14 and 16. The side plates 52 are thus located in laterally spaced apart relationship, and extend from the front end of frame 12 to the uprights 28 located at the rear corners of the frame 12.

Figure 4:
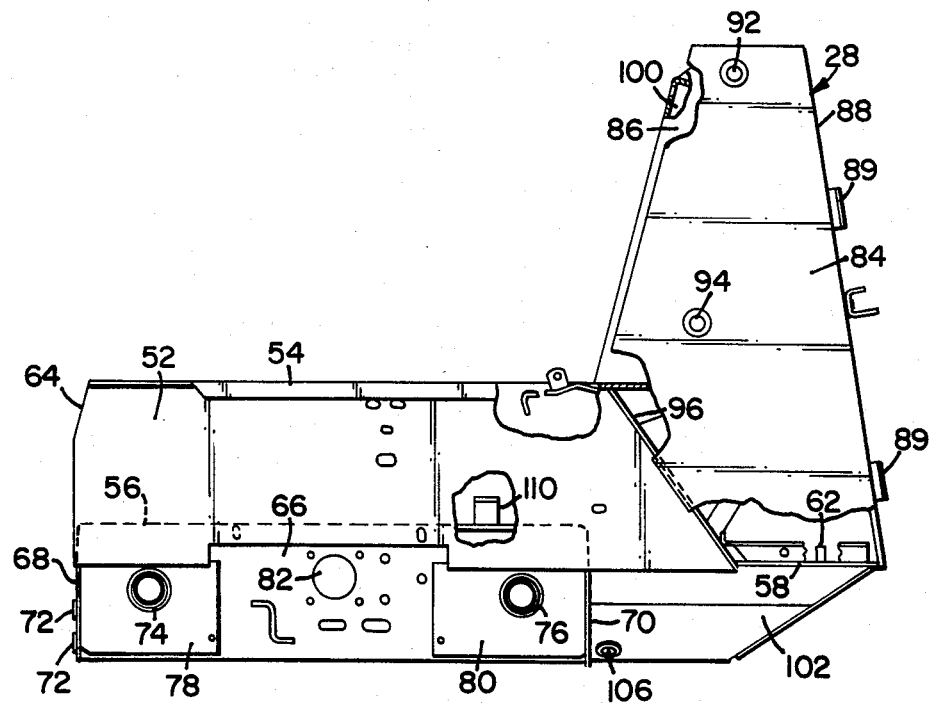
FIG. 4 is side view of the frame of FIG. 2.

A generally rectangular, forward floor plate 56 is secured between the side plates 52. The back end of the floor plate 56 angles downwardly as is best seen in FIGS. 4 and 6, and is connected to a rear floor plate 58. As illustrated, the floor plates 56 and 58 are constructed of two sections of plate material formed and welded together; however, the plates could be constructed from a single continuous piece of material if desired.

It will thus be appreciated that the floor plates 56 and 58 of frame 12 are each of substantially flat configuration, with the rear floor plate 58 being relatively lower then the forward floor plate 56. The rear floor plate 58 extends beyond the back ends of the side plates 52 and between the uprights 28 to define therewith the engine compartment 60 as is best seen in FIG. 6. Lugs 62 are preferably provided on the rear floor plate 58 for mounting the engine 46. The forward floor plate 56, together with the side plates 52 and a front cross member 64 connected between the front ends of the side plates, defines a portion of the operator's compartment 18 for the operator's legs and suitable foot controls (not shown).

An elongate, hollow transmission case 66 is secured beneath the forward floor plate 56 and between the lower ends of the side plates 52. The transmission case 66 is preferably of generally rectangular cross section, constructed of interconnected structural members. For example, the transmission case 66 can be formed from a single piece of channel stock of U-shaped cross section connected at its upper ends to the floor plate 56, or the transmission case can be of split construction consisting of opposing sections of L-shaped cross section connected at their top ends to the floor plate 56 and interconnected at their lower ends.

The front end of transmission case 66 is closed by a front end plate 68 secured between the lower front ends of the side plates 52. The back end of the transmission case 66 is closed by a rear end plate 70 secured between the lower rear ends of the side plates 52. If desired, the front and rear plates 68 and 70 can be separate pieces of plate material; however, in the preferred embodiment, the front and rear end plates 68 and 70 are integral portions of the forward floor plate 56 such that the floor plate is turned downwardly at both sides. If desired, the rear end plate 70 can be an integral portion of the rear floor plate 58.

It will be thus appreciated that the transmission case 66 extends the entire length of the forward floor plate 56 and is comprised on all sides of interconnected structural members enclosing the hydrostatic transmissions (not shown) for driving wheels 14 and 16. The transmission case 66 thus forms an integral part of frame 12, and also serves as a reservoir so that the hydrostatic transmissions can operate in a bath of lubricant. A pair of removable plugs 72 are provided in the front end plate 68 for draining and replenishing fluid in the transmission case 66 as necessary.

A pair of tubular axle housings 74 and 76 extend outwardly from the transmission case 66 on each side of the frame 12. The front pair of axle housings 74 are coaxial and are adapted for journaling the axles (not shown) on which the front wheels 14 are mounted. Similarly, the rear pair of axle housings 76 are coaxial and adapted for journaling the axles (not shown) on which the rear wheels 16 are mounted. A brace 78 is provided for interconnecting each front axle housing 74 with the transmission case 66, associated side plate 52, and the front end plate 68. A brace 80 is provided for interconnecting each rear axle housing 76 with the transmission case 66, associated side plate 52, and the rear end plate 70. Transmission case 66, and the end plate 70. It will thus be appreciated that each laterally extending axle housing is reinforced by a brace located outward of the transmission case 66 and connected to three other stuctural members of the frame 12.

Figure 3:
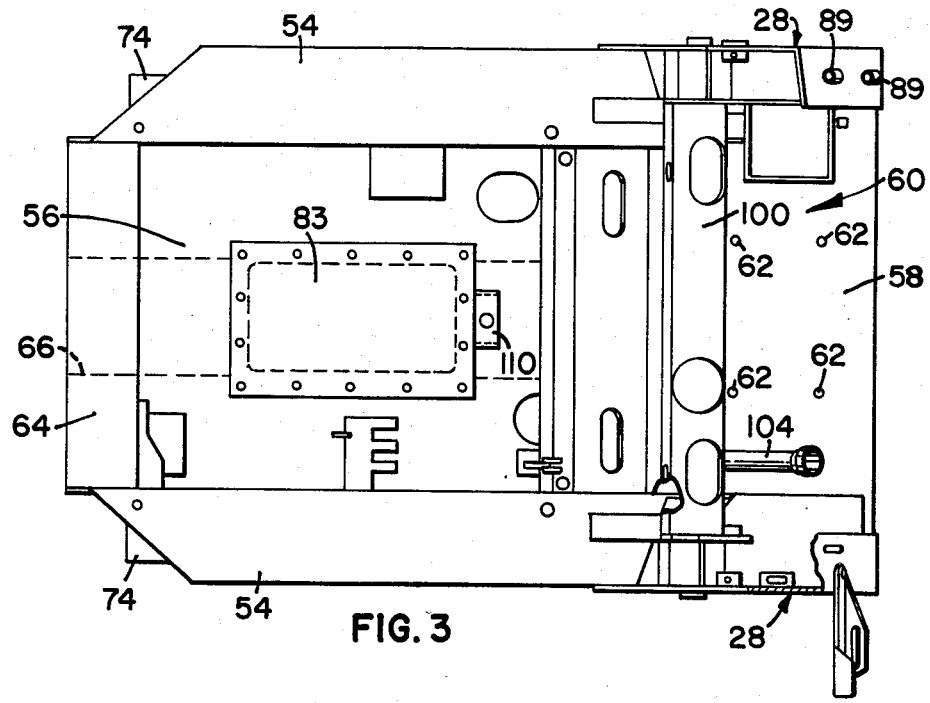
FIG. 3 is a top view of the frame of FIG. 2.

Removable access covers (not shown) are provided between each pair of braces 78 and 80 for maintenance and servicing of the hydraulic motors (not shown) mounted over openings 82 provided in opposite sides of the transmission case 66 for driving the hydrostatic transmissions (not shown) within the transmission case. As is best seen in FIG. 3, a removable access cover 83 is also provided in the front floor plate 56 for service and maintenance of the hydrostatic transmissions and brake systems (not shown) within the transmission case 66.

The uprights 28 are located behind the fenders 54 on opposite sides of the rear floor plate 58. The uprights 28 are of generally channel-like configuration in order to receive the ends of the lift arms 24 and cylinders 34. Each upright 28 includes an outer plate 84 extending upwardly from the associated fender 54, an inner plate 86 extending upwardly from the associated fender 54, and a back plate 88 connected across the rear edges of the side plates. In accordance with the preferred embodiment shown, the outside plate 84 and the back plate 88 are formed from a single piece of material to minimize separate piece parts and increase rigidity. A pair of bushings 89 are provided on the back plate 88 of one of the uprights 28 to serve as hinge points for the door 48.

Each upright 28 includes some braces or stiffeners for reinforcement. An upper stiffener plate 90 interconnects plates 84 and 86 between a pair of bushed holes 92 and 94 which define the pivot points 26 and 38, respectively. A lower stiffener plate 96 is connected between the rear end of each side plate 52, fender 54, and the outer plate 84 of the associated upright 28. If desired, another stiffener plate 98, as is best seen in FIG. 6, can be connected between the rear floor plate 58 and the lower end of the inside plate 86 of the upright 28 supporting the door 48, for additional reinforcement.

It will thus be appreciated that the uprights 28 are closed at the rear by the back plates 88, which are preferably integral with the outer plates 84. The front edges of the inner plates 86 are preferably turned inwardly as shown for rigidity. The lower ends of the uprights 28 are closed by opposite sides of the rear floor plate 58 and by stiffener plates 96, which cooperate with the fenders 54 to define the fender wells for wheels 14 and 16. The foward and top portions of the uprights 28 above fenders 54 are open.

A rear cross member 100 is connected between the uprights 28. As illustrated, the upper portion of the cross member 100 is turned and connected between the upper portions of the uprights 28, while the lower portion of the cross member is turned and connected between the rear portions of the side plates 52 so as to form a recess behind the back of seat 22, which is partially supported by the rear cross-member. A fuel tank (not shown) is disposed in the recess between the back of seat 22 and cross member 100. The cross member 100 thus serves as an integral component of frame 12 as well as a firewall to separate the engine compartment 60 from the operator's compartment 18.

Figure 2:
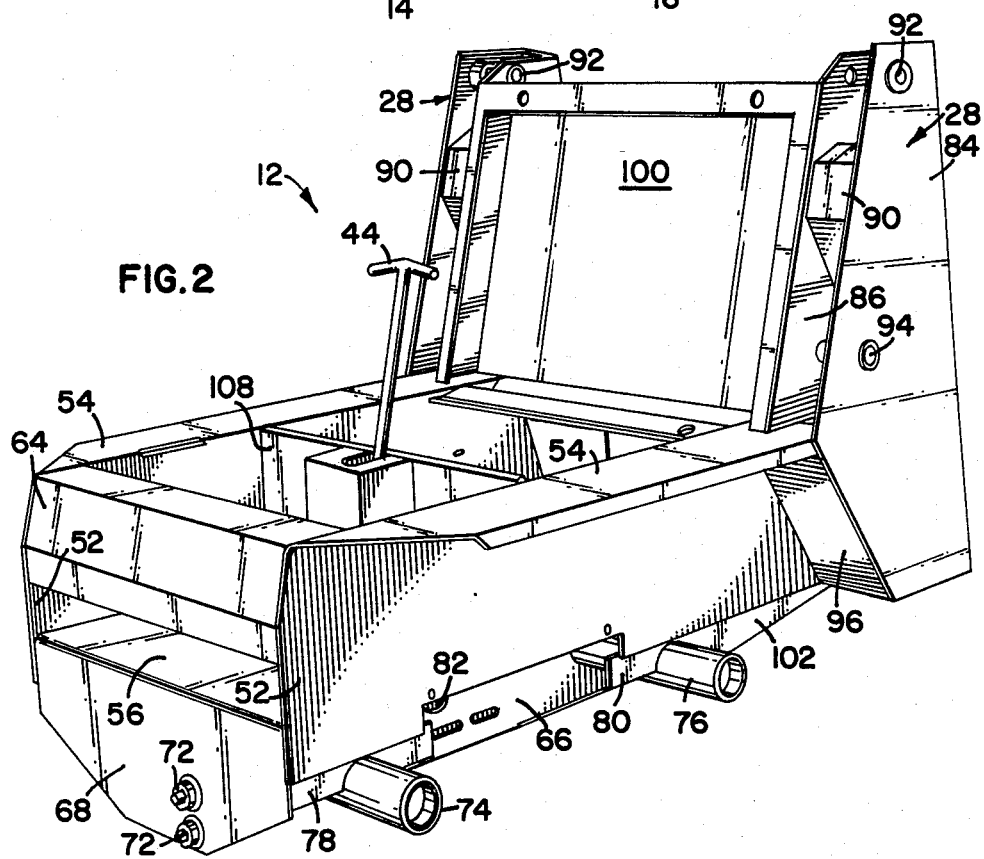
FIG. 2 is a perspective view of the unitary frame incorporating the invention.

In accordance with the preferred embodiment, a hydraulic resevoir 102 is provided immediately behind the transmission case 56 and beneath the rear floor plate 58 for containing the hydraulic fluid for the pump assembly 50. The reservoir 102 can be formed from a piece of material of U-shaped cross-section and a piece of plate material secured to the rear end plate 70 and the rear floor plate 58. This location and construction of reservoir 102 helps to lower the center of gravity of the vehicle, stiffen the mounting for engine 46, and counterbalance the bucket 30. A fill pipe 104 extending through the rear floor plate 58 is provided in the engine compartment 60, and a removable plug 106 is provided in the lower portion of reservoir 102 for drainage. An intermediate cross member 108 is preferably connected between the side plates 52 and the front and rear cross members 64 and 100, as shown in FIG. 2. The intermediate cross member 108 has been omitted from FIGS. 3–6 for clarity. The intermediate cross member 108 serves as a structural component of frame 12 as well as a housing and support for the T bar handle 44. The pump assembly 50 is located behind the cross member 108 and beneath seat 22, on a mounting bracket 110.

From the foregoing, it will thus be apparent that invention comprises a unitary frame having several advantages over the prior art. One significant advantage involves the fact that the frame herein is of monocoque-type construction utilizing a relatively fewer number of structural members formed, arranged and welded together as an integral unit to achieve greater rigidity while reducing production costs. The frame herein utilizes a single transmission case as an integral component of the frame, but in conjunction with a substantially flat floor plate in order to provide more space for foot pedals and the operator's legs. This construction also facilitates interchangeability and reduces both complication and expense in adapting the frame for a different size skid steer loader. Other advantages will be evident to those skilled in the art.

Although particular embodiments of the invention have been illustrated in the accompanying Drawings and described in the foregoing Detailed Description, it will be understood that the invention is not limited to the embodiments disclosed, but is intended to embrace any equivalents, alternatives, modifications and/or rearrangements of elements falling within the scope of the invention as defined by the following Claims.

I claim:

1. A unitary, monocoque-type frame for a skid steer loader, comprising:
   an elongate, hollow transmission case having closed front and rear ends, top and bottom sides, and lateral sides;
   a plurality of longitudinally spaced apart axles housings extending from the lateral sides of said transmission case, said axle housings being arranged in opposite coaxial pairs;

a floor plate secured to the top side of said transmission case, said floor plate having opposite longitudinal edges and front and rear portions with the front portion extending at least to the front end of said transmission case and the rear portion extending beyond the rear end of said transmission case;

a pair of longitudinal side plates secured to said floor plate in laterally spaced apart relationship outward from said transmission case, said side plates having generally vertical lower portions and upper portions with the upper portions of said side plates being formed into fenders and the lower portions being secured along the longitudinal edges of said floor plate;

a front cross member secured between said side plates;

a brace secured between each axle housing, lower portion of the associated side plate, and said transmission case;

a pair of uprights secured in laterally spaced apart relationship to the rear portion of said floor plate, each upright also being secured to the associated side plate; and a rear cross member secured between said uprights and said side plate in spaced relationship with said floor plate.

2. The frame of claim 1, wherein said transmission case is of generally rectangular cross section.

3. The frame of claime 1, wherein two axle housings are provided on each lateral side of said transmission case.

4. The frame of claim 1, wherein the front and rear portions of said floor plate are substantially flat, with the rear portion being positioned a predetermined distance below the front portion.

5. The frame of claim 1, wherein the front and rear ends of said transmission case comprise plates formed as integral parts of said floor plate and secured between the lower portions of said side plates.

6. The frame of claim 1, wherein each upright comprises:
a generally vertical outer plate secured at its lower end to the rear portion of said floor plate;
a generally vertical inner plate positioned in spaced relationship with said outer plate, said inner plate being secured at its lower end to the associated side plate;
a back plate secured across the rear ends of said inner and outer plates;
said inner and outer plates including a pair of vertically spaced apart coaxial openings therein adapted to define pivot points;
an upper stiffener plate secured between said inner and outer plates and the openings therein; and
a lower stiffener plate secured between said outer plate and the associated side plate.

7. The frame of claim 1, further including:
a fluid reservoir located immediately behind said transmission case and beneath the rear portion of said floor plate.

8. The frame of claim 1, further including:
a pair of vertically spaced apart removable drain plugs located in said transmission case.

9. The frame of claim 1, further including:
a removable access plate located over an opening in said floor plate to the interior of said transmission case.

10. A unitary monocoque-type frame for a skid steer loader, comprising:
an elongate, tubular transmission case;
a plurality of longitudinally spaced apart axle housings extending from opposite sides of said transmission case, said axle housings being arranged in lateral coaxial pairs;
a floor plate secured to the top side of said transmission case, said floor plate having opposite longitudinal edges and front and rear sections with the front section extending to the front end of said transmission case and the rear section extending beyond the rear end of said transmission case;
a pair of longitudinal side plates secured in laterally spaced apart relationship to said floor plate, said side plates having generally vertical lower portions and upper portions with the upper portions being formed into fenders and the lower portions being secured along the longitudinal edges of said floor plate;
front and back end plates secured across the front and rear ends, respectively, of said transmission case and between the lower portions of said side plates;
a front cross member secured between the lower portions of said side plates;
a brace secured between each axle housing, lower portion of the associated side plate, and said transmission case;
a pair of uprights secured in laterally spaced apart relationship to the rear section of said floor plate and to said side plates; and
a rear cross member secured between said uprights and said side plates in spaced relationship with said floor plate.

11. The frame of claim 10, wherein the front and rear sections of said floor plate are substantially flat, with the rear section being positioned a predetermined distance below the front section.

12. The frame of claim 10, wherein said front and rear end plates are formed as integral parts of said floor plate.

13. The frame of claim 10, wherein each upright comprises:
a generally vertical outer plate secured at its lower end to the rear section of said floor plate;
a generally vertical inner plate positioned in spaced relationship with said outer plate, said inner plate being secured at its lower end to the associated side plate;
a back plate secured across the rear ends of said inner and outer plates;
said inner and outer plates including a pair of vertically spaced apart coaxial openings therein adapted to define pivot points;
an upper stiffener plate secured between said inner and outer plates and the openings therein; and
a lower stiffener plate secured between said outer plate and the associated side plate.

14. The frame of claim 10, further including:
a fluid reservoir located immediately behind said transmission case and beneath the rear section of said floor plate.

15. A unitary monocoque-type frame for a vehicle, which comprises:
a pair of laterally spaced apart longitudinal side plates having upper and lower portions and front and rear ends, the upper portions of said side plates being formed into fenders;

a forward floor plate secured between the lower portions of said side plates and extending to the front ends of said side plates;

a rearward floor plate secured between the lower portions of said side plates behind said forward floor plate and extending beyond the rear ends of said side plates;

an elongate, hollow transmission case secured to the underside of said forward floor plate and extending between said side plates, the opposite ends of said forward floor plate being turned down and secured across the ends of said transmission case;

a front cross member secured between the lower portions of said side plates;

a pair of longitudinally spaced apart axle housings extending outwardly from each lateral side of said transmission case, said axle housings being arranged in lateral coaxial pairs;

a brace interconnecting each axle housing with adjacent portions of said transmission case and the associated side plate;

a pair of laterally spaced apart uprights positioned generally behind said side plates and secured to said rearward floor plate; and a rear cross member secured between said uprights and lower portions of said side plates in spaced relationship with said floor plates.

16. The frame of claim 15, wherein the forward and rearward floor plates are each substantially flat, and wherein said rearward floor plate is positioned a predetermined distance below said foward floor plate.

17. The frame of claim 15, wherein each upright comprises:

a generally vertical outer plate secured at its lower end to the said rearward floor plate;

a generally vertical inner plate positioned in spaced relationship with said outer plate, said inner plate being secured at its lower end to the associated side plate;

a back plate secured across the rear ends of said inner and outer plates;

said inner and outer plates including a pair of vertically spaced apart coaxial openings therein adapted to define pivot points;

an upper stiffener plate secured between said inner and outer plates and the openings therein; and a lower stiffener plate secured between said outer plate and the associated side plate.

18. The frame of claim 15, further including:

a fluid reservoir located immediately behind said transmission case and second beneath said rearward floor plate.

* * * * *